United States Patent [19]
Kätscher et al.

[11] Patent Number: 4,905,546
[45] Date of Patent: Mar. 6, 1990

[54] TWIST-PROOF MECHANICAL CONNECTING ASSEMBLY

[75] Inventors: Erich Kätscher, Marloffstein; Siegfried Förner, Erlangen; Alexander Hümmeler, Röttenbach; Günter Rabe, Bubenreuth; Harald Hegenberger, Adelsdorf/Aisch, all of Fed. Rep. of Germany

[73] Assignee: Siemens Aktiengesellschaft, Berlin and Munich, Fed. Rep. of Germany

[21] Appl. No.: 311,408

[22] Filed: Feb. 13, 1989

Related U.S. Application Data

[63] Continuation of Ser. No. 115,938, Oct. 30, 1987, abandoned.

[30] Foreign Application Priority Data

Oct. 31, 1986 [DE] Fed. Rep. of Germany ....... 3637111
Jul. 22, 1987 [DE] Fed. Rep. of Germany ....... 3724307

[51] Int. Cl.4 ............................................. B25B 13/50
[52] U.S. Cl. .......................................... 81/54; 411/271
[58] Field of Search ............... 29/243.5, 243.52, 252, 29/261, 262; 81/54; 411/271, 183, 212, 213, 925, 967, 396

[56] References Cited

U.S. PATENT DOCUMENTS 4,289,287 12/1966 Guritz ............................ 29/243.52

FOREIGN PATENT DOCUMENTS 0026141 4/1981 European Pat. Off. ............ 411/183

Primary Examiner—Frederick R. Schmidt
Assistant Examiner—Lawrence Cruz
Attorney, Agent, or Firm—Herbert L. Lerner; Laurence A. Greenberg

[57] ABSTRACT

A twist-proof mechanical connecting assembly includes first and second components. The first component has a recess formed therein with a groove in the form of at least one pocket. A connecting element in the form of a bolt penetrates the first component and is secured to the second component for interconnecting the components. The bolt has a polygonal head including a safety cup embedded in the recess. At least part of the safety cup is outwardly bent into the at least one pocket for locking the safety cup to the first component and securing the connecting element against loosening.

9 Claims, 3 Drawing Sheets

TWIST-PROOF MECHANICAL CONNECTING ASSEMBLY

This application is a continuation, of application Ser. No. 115,938, filed Oct. 30, 1987, now abandoned.

The invention relates to a mechanical connecting assembly including a connecting element for interconnecting first and second components, in the form of a bolt having a head penetrating the first component and secured to the second component, the head of the connecting element having a safety cup formed thereon and embedded in a recess in the first component provided with a groove into which the safety cup is outwardly bent in order to secure against loosening.

Such connecting elements are used particularly in the reactor field where it must be assured that the mechanical connection can be remotely broken in spite of the securing thereof, but where a broken screw or part of the screw head must be prevented from dropping out of the seat thereof and leading to an operational malfunction.

A connecting element of the type described above is known from Published European Application No. 0 026 141. A torsion or twist-proof cap screw is disclosed therein in which a safety cup which is formed on the head is provided with an operating slit. In the screwed-in position, the head of the screw is embedded in a recess which is provided with an annular groove and conical enlargements into which the safety cup is bent by means of a striking pin. Jolting forces are exerted on the head of the cap screw by axial blows during the securing operation. Only a loose flange is formed, although the head has been secured against twisting by the securing operation, since the edge is drawn into the groove in the form of a tangent because of the bending of the safety cup. If the head breaks off, it performs shaking movements caused by the flow and drops out after a period of time. There is the additional danger that the screw head will break at the point weakened by the slit and the parts of the head will drop out. This leads to an operational malfunction if, for example, the parts reach the fuel assembly and block it during extraction. Additionally, if a screw secured by welding is later to be replaced by a tapped screw with a safety cup in the prior art device, an annular groove and several conical enlargements must be formed in the recess for the screw head. This formation requires a great amount of time even if performed together with repeated tests, since several different recesses must be made with a predetermined exactness by remote control.

It is accordingly an object of the invention to provide a torsion or twist-proof connecting assembly, which overcomes the hereinafore-mentioned disadvantages of the heretoforeknown devices of this general type and which provides a simple manner of preventing the connecting part from becoming loose and broken parts from dropping out.

With the foregoing and other objects in view there is provided, in accordance with the invention, a twist-proof mechanical connecting assembly, comprising first and second components, the first component having a recess formed therein with a groove in the form of at least one pocket, a connecting element in the form of a bolt penetrating the first component and secured to the second component for interconnecting the components, the bolt having a polygonal head including a safety cup embedded in the recess, at least part of the safety cup being outwardly bent into the at least one pocket for form-lockingly connecting the safety cup to the first component and securing the connecting element against loosening.

The danger of the head breaking is reduced in this way and a repeated test with an ultrasound probe is made easier, since a test of the connecting element can be simply made from the direction of the end or front surface. Furthermore, the connecting element of the invention only requires the removal of small amounts of material and little exactness for producing the pockets (for example by eroding) when retrofitting or replacing a conventional connecting element, so that the work required can be carried out during a test with little expenditure of time. Thus the mechanical connecting element can be installed later in a considerably simpler and quicker manner than the prior art connecting element.

In accordance with another feature of the invention, the polygonal head has ribs disposed in the form of a star.

In accordance with a further feature of the invention, the bolt is in the form of a screw.

In accordance with an added feature of the invention, the bolt is threaded, and there is provided a nut disposed on the threaded bolt.

In accordance with an additional feature of the invention, the bolt has a given diameter below the head and the head has a polygonal portion with a diameter which is at least as large as the given diameter.

In accordance with yet another feature of the invention, the head has a polygonal portion and the safety cup surrounds and is spaced from the polygonal portion.

In accordance with yet a further feature of the invention, the safety cup has an edge, the pocket has a cross section matched to the edge of the safety cup, and the edge of the safety cup is braced free of play in axial and radial directions by outwardly bending into the pocket.

In accordance with yet an added feature of the invention, the pocket has a trapezoidal cross section.

In accordance with yet an additional feature of the invention, the head has a polygonal portion, and there is provided a tool for securing the connecting element, the tool having a guide part axially insertable between the polygonal portion and the safety cup and a radially outwardly pivotable bent projection.

In this way and in contrast to the prior art device, slowly increasing axial forces can be applied during the bending of the safety cup, thus avoiding axial blows and jolting forces to the head of the connecting element as well as reciprocal forces on the tool. Due to this method of assembly, strains on the connecting element which might lead to rupture are further reduced.

In accordance with still another feature of the invention, the tool has a basic body including the guide part, at least one rocking lever having two ends, a joint supporting one of the ends of the at least one rocking lever on the basic body, the other of the ends of the rocking lever including the bent projection, another lever having two ends, one of the ends of the other lever being pivotal on the rocking lever between the joint and the bent projection, a rod connected to the other end of the other lever, and a linear drive connected to the rod.

In accordance with a concomitant feature of the invention, the linear drive is in the form of a cylinder with a piston disposed in the basic body and actuated by a pressure medium.

Other features which are considered as characteristic for the invention are set forth in the appended claims.

Although the invention is illustrated and described herein as embodied in a torsion or twist-proof mechanical connecting assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
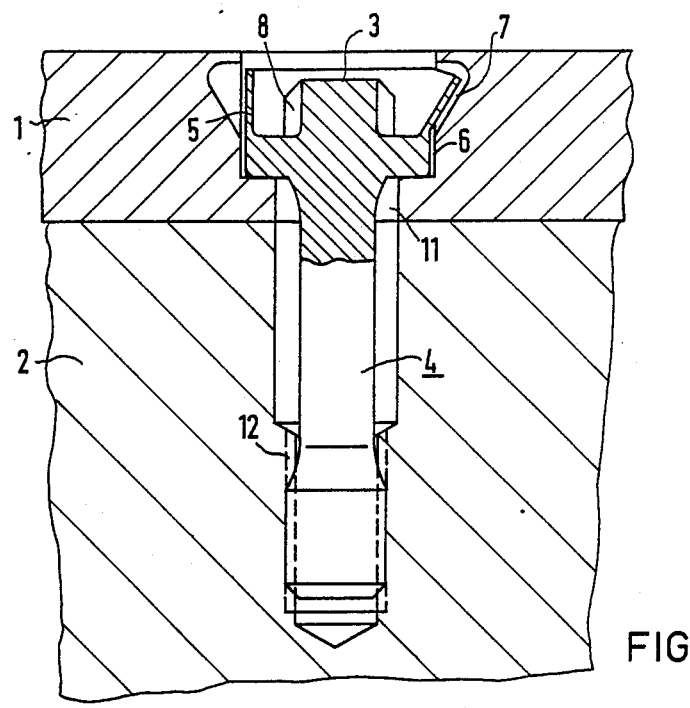
FIG. 1 is a fragmentary, diagrammatic, partly broken-away cross-sectional view of a mechanical connection in which two components are interconnected by means of a screw.

Referring now to the figures of the drawings in detail and first, particularly, to FIG. 1 thereof, there is seen a first component designated with reference numeral 1 which is connected with a second component 2 by means of a mechanical connecting element in the form of a screw. A threaded bolt 4 provided with a head 3 penetrates an opening 11 in the first component 1 and is secured in a threaded bore 12 in the second component 2. The head 3 of the connecting element is embedded in a recess or depression 6 in the component 1. A safety or locking cup 5 of the head 3 has a bottom formed on the lower part of the head 3 of the connecting element. The safety cup surrounds and is spaced from the polygonal portion of the head.

Figure 2:
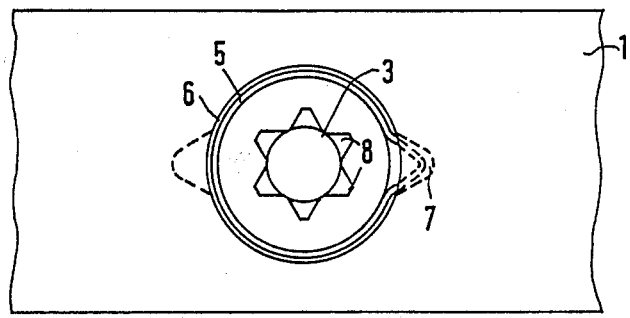
FIG. 2 is a top-plan view of the connection shown in FIG. 1.

As is also seen in FIG. 2, at least one groove in the form of a pocket 7 is provided in the recess 6. A part of the safety cup can be bent into the pocket 7 for the purpose of providing a form-locking connection which prevents the threaded bolt 4 from twisting and from dropping out in case it snaps. A form-locking connection is one which is connects two elements together due to the shape of the elements themselves, as opposed to a force-locking connection, which locks the elements together by force external to the elements. A broken screw head can be secured against dropping out by providing two mutually opposite pockets 7.

The head 3 of the connecting element which is in the form of a screw is provided in the shape of a polygon having ribs 8 disposed in a star shape. This permits satisfactory tightening of the screw. The diameter of the polygon is equal to or larger than the diameter of the bolt 4. This construction permits testing of the screw by ultra sound in an especially simple way from the direction of the front or end surface, while increasing the mechanical stability of the head.

Figure 3:
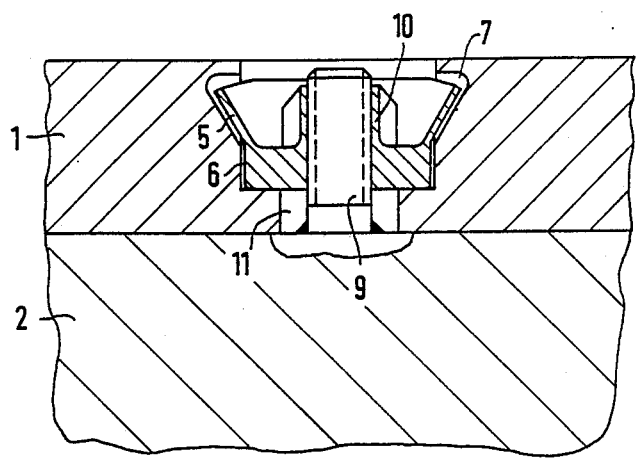
FIG. 3 is a cross-sectional view similar to FIG. 1 of a second embodiment of a mechanical connection in which two components are interconnected by means of a stay bolt and a nut.

As shown in FIG. 3, the mechanical connecting element can also be a threaded bolt 9 onto which a nut 10 can be screwed. The threaded bolt 9 is advantageously secured in the form of a stay bolt by welding it to the second component 2 and it penetrates an opening 11 in the first component 1 which is connected to the second component 2 by the nut 10.

The nut 10 is embedded in a recess 6 in the first component 1 and has a safety cup 5 formed on the bottom of the nut. Parts of the nut at opposite sides are bent into pockets 7 in the recess 6 in order to provide a form-locking connection with the nut 10.

Figure 4:
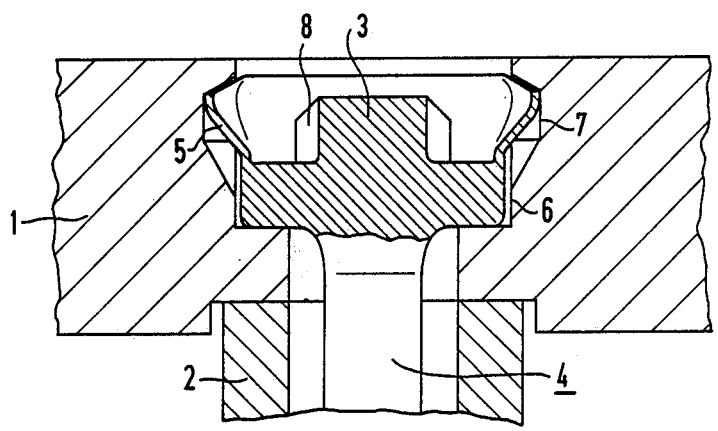
FIG. 4 is a cross-sectional view of a third embodiment of a connecting element.

It can be seen from FIG. 4 that the cross section of the pocket 7 has a shape which permits the edge of the safety cup 5 to be braced by bending in the pocket 7 without play in the axial and radial directions. This structure reliably prevents a possibly broken head from dropping out, even when using the connecting element in the pressure vessel of a reactor.

Figure 5:
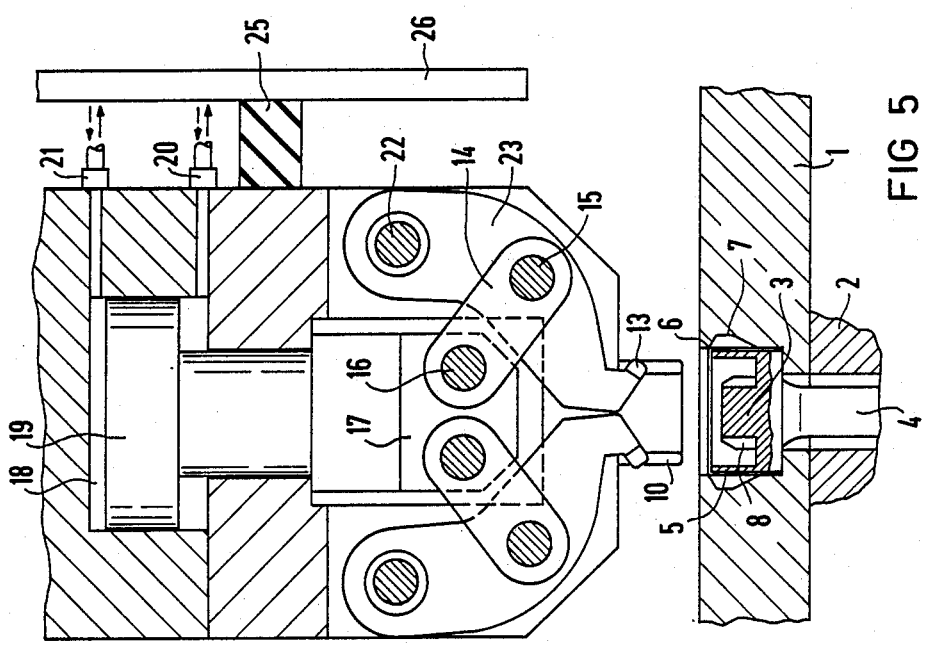
FIG. 5 is a cross-sectional view of a tool for securing the connecting element below the tool prior to positioning on the screw.

FIG. 5 shows a tool which is provided for securing the connecting element. A basic body 24 of the tool has a guide part 10 in the form of a slotted cylinder insertable between the polygonal portion of the head and the safety cup 5 as well as a bent projection or nose 13 which can be swung out radially. One end of at least one rocking lever 23 is supported at a joint 22 of the basic body 24 and the other end thereof contains the bent projection 23 insertable into the safety cup 5. One end of a further lever 14 is pivotable on the end of the rocking lever at a pivot point 15 located between the joint 22 and the bent projection 13 of the rocking lever 23 and the other end of the further lever 14 is pivotable in a pivot point 16 at a rod 17 which is connected with a linear drive.

A cylinder 18 having a piston 19 disposed in the basic body 24 and actuable by pressure means can serve in an advantageous way as a linear drive. The cylinder 18 is equipped with pressure medium lines 20, 21 for the actuation thereof by pressure medium.

The insertion and operation of the tool is remotely controlled in a conventional manner by means of a manipulator.

When inserting the tool, the cylinder 18 is acted upon through the pressure medium line 20, so that the piston 19 is disposed in its upper position and the bent projection 13 is disposed in a retracted position.

Figure 6:
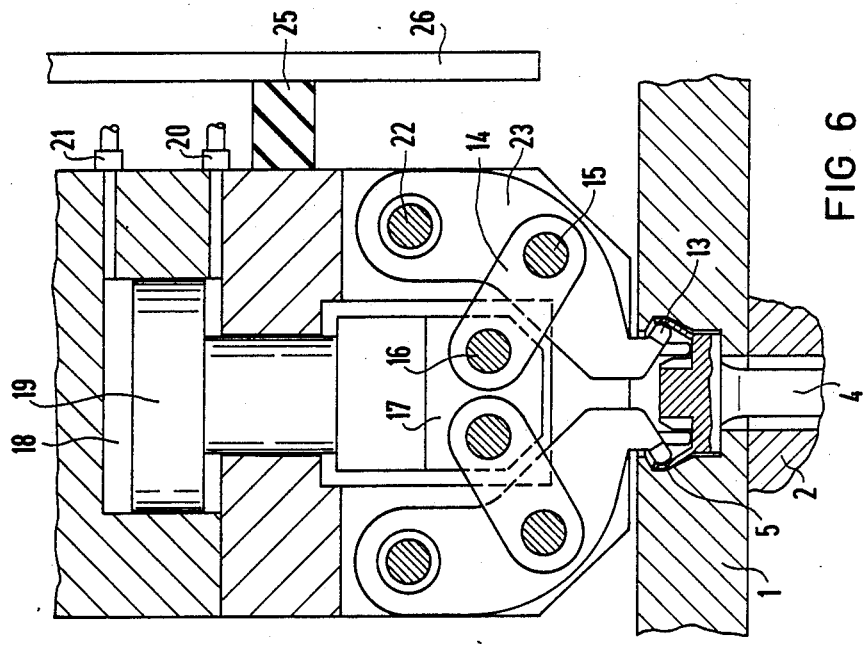
FIG. 6 is a cross-sectional view of the tool shown in FIG. 5 which is engaged with the connecting element in the operating position.

If the guide part 10 is located between the polygonal portion of the head and the safety cup 5, the pressure medium line 21 is actuated, the piston 19 moves downward and pushes the rocking lever 23 with the bent projection 13 radially outwardly by means of the lever 14, so that the safety cup 5 is bent open on opposite sides and is braced without play in an axial and radial direction, as seen in FIG. 6. In this case it is advantageous for the pockets to have a trapezoidal cross section for obtaining a lasting bracing.

We claim:

1. Twist-proof mechanical connecting assembly, comprising a first component and a second component, said first component having a recess formed therein, said recess having at least one pocket with an opening exclusively in said recess, a connecting element in the form of a bolt penetrating said first component and secured to said second component for interconnecting said components, said bolt having a head including a polygonal portion and a safety cup being integral with said polygonal portion and embedded in said recess, said safety cup having an edge, said pocket having a cross section matched to said edge of said safety cup, and a tool for securing said connecting element, said tool having a guide part axially insertable between said polygonal portion and said safety cup, and said tool having a bent nose for outwardly bending said edge of said safety cup into said pocket and bracing said edge of said safety cup against said first component and free of play in axial and radial directions.

2. Connecting assembly according to claim 1, wherein said polygonal head has ribs disposed in the form of a star.

3. Connecting assembly according to claim 1, wherein said bolt is in the form of a screw.

4. Connecting assembly according to claim 1, wherein said bolt is threaded, and including a nut disposed on said threaded bolt.

5. Connecting assembly according to claim 1, wherein said bolt has a given diameter below said head and said head has a polygonal portion with a diameter which is at least as large as said given diameter.

6. Connecting assembly according to claim 1, wherein said head has a polygonal portion and said safety cup surrounds and is spaced from said polygonal portion.

7. Connecting assembly according to claim 1, wherein said pocket has a trapezoidal cross section.

8. Connecting assembly according to claim 1, wherein said tool has a basic body including said guide part, at least one rocking lever having two ends, a joint supporting one of said ends of said at least one rocking lever on said basic body, the other of said ends of said rocking lever including said bent projection, another lever having two ends, one of said ends of said other lever being pivotal on said rocking lever between said joint and said bent projection, a rod connected to said other end of said other lever, and a linear drive connected to said rod.

9. Connecting assembly according to claim 8, wherein said linear drive is in the form of a cylinder with a piston disposed in said basic body and actuated by a pressure medium.

* * * * *